(12) United States Patent
Knies et al.

(10) Patent No.: US 7,368,517 B2
(45) Date of Patent: May 6, 2008

(54) CROSSLINKED AND BRANCHED ORGANOPOLYSILANES

(75) Inventors: Wolfgang Knies, Burghausen (DE); Karin Boegershausen, Burghausen (DE); Annemarie Weinhart, Haiming (DE)

(73) Assignee: Wacker Chemie AG, Munich (DE)

( * ) Notice: Subject to any disclaimer, the term of this patent is extended or adjusted under 35 U.S.C. 154(b) by 236 days.

(21) Appl. No.: 11/176,787

(22) Filed: Jul. 7, 2005

(65) Prior Publication Data
US 2006/0030687 A1    Feb. 9, 2006

(30) Foreign Application Priority Data
Aug. 5, 2004   (DE) .................... 10 2004 038 145

(51) Int. Cl.
*C08G 77/00*    (2006.01)
(52) U.S. Cl. ....................................... 528/14
(58) Field of Classification Search ................. None
See application file for complete search history.

(56) References Cited

U.S. PATENT DOCUMENTS

| 4,921,321 A | | 5/1990 | Weidman |
| 5,641,849 A | * | 6/1997 | Nishida et al. ............... 528/10 |
| 5,905,139 A | | 5/1999 | Mori et al. |
| 2002/0177660 A1 | | 11/2002 | Imoto et al. |
| 2004/0005109 A1 | | 1/2004 | Tsushima et al. |

FOREIGN PATENT DOCUMENTS

| EP | 0 949 289 | | 10/1999 |
| JP | 5-25282 A | * | 2/1993 |
| JP | 7-113010 | | 5/1995 |
| JP | 2003-277507 | * | 10/2003 |

OTHER PUBLICATIONS

Translation of paragraph 54 of JP 2003-277507 prepared by USPTO translation office.*

Patent Abstract of Japan corresponding to JP 10237177, Sep. 8, 1998.

Patent Abstract of Japan corresponding to JP 07113010, May 2, 1995.

* cited by examiner

*Primary Examiner*—Marc S. Zimmer
(74) *Attorney, Agent, or Firm*—Brooks Kushman P.C.

(57) ABSTRACT

The invention relates to a process for preparing crosslinked or branched organopolysilanes which contain at least one unit of the general formulae 1 and/or 2

$$RSi\equiv,\qquad(1)$$

$$=Si=,\qquad(2)$$

at least one unit of the general formula 3

$$R_2Si=,\qquad(3)$$

and optionally units of the general formula 4

$$R_3Si-\qquad(4)$$

in which silane(s) of the general formulae 1a and 2a $$RSiX_3,\qquad(1a)$$

$$SiX_4,\qquad(2a)$$

and 3a $$R_2SiX_2,\qquad(3a)$$

and optionally silane of the general formula 4a $$R_3SiX,\qquad(4a)$$

where R is hydrocarbyl and X is halo, are reacted with elemental metal, the addition of the reactants being such that the silane of the general formula 3a in the reaction with elemental metal contains at most 2 mol % of silane which is selected from silanes of the general formulae 1a and 2a, and to the organopolysilanes obtainable by the process.

18 Claims, No Drawings

CROSSLINKED AND BRANCHED ORGANOPOLYSILANES

BACKGROUND OF THE INVENTION

1. Field of the Invention

The invention relates to crosslinked and branched organopolysilanes and to a process for their preparation.

2. Description of the Related Art

The preparation of polysilanes is described, for example, in published application EP 949289 A and in U.S. Pat. No. 4,921,321. Organopolysilanes which are prepared by known processes and which have both linear fractions and branches and crosslinks are very difficult to filter. This raises the costs for their preparation to an exceptional degree.

SUMMARY OF THE INVENTION

It is an object of the invention to accentuate provide the filterability of branched and crosslinked organopolysilanes, and thus lower the overall process time. This and other objectives are met by restricting the amount of trihalo- and tetrahalosilane which is available to react with alkali metal in the presence of dihalosilane.

DETAILED DESCRIPTION OF THE PREFERRED EMBODIMENT(S)

The invention thus provides a process for preparing crosslinked or branched organopolysilanes which contain at least one unit which is selected from units of the general formulae 1 and 2

$$RSi\equiv \quad (1), \text{ and}$$

$$=Si= \quad (2),$$

and at least one unit of the general formula 3

$$R_2Si= \quad (3)$$

and optionally units of the general formula 4

$$R_3Si- \quad (4)$$

wherein one or more silanes selected from among silanes of the general formulae 1a and 2a $$RSiX_3 \quad (1a),$$

$$SiX_4 \quad (2a),$$

and at least one silane of the general formula 3a $$R_2SiX_2 \quad (3a)$$

and optionally silane of the general formula 4a $$R_3SiX \quad (4a)$$

where
R is hydrogen or a hydrocarbyl radical having from 1 to 18 carbon atoms and
X is fluorine, chlorine or bromine,
is reacted with alkali metal, alkaline earth metal, or mixtures thereof,
the addition of the reactants being adjusted such that the silane of the general formula 3a in the reaction with elemental metal contains at most 2 mol % of silane which is selected from silanes of the general formulae 1a and 2a.

The silane of the general formula 3a is thus reacted with the elemental metal substantially separately from the reaction of the silanes of the general formulae 1a and/or 2a with the elemental metal. The crosslinked or branched organopolysilanes which are formed thereby can be filtered readily.

The silane of the general formula 3a, in the reaction with elemental metal, preferably contains at most 1 mol %, more preferably at most 0.1 mol %, and in particular at most 0.01 mol %, of silane which is selected from silanes of the general formulae 1a and 2a.

The silanes of the general formulae 1a, 2a and 4a may be used in a mixture, as may also silanes of the general formulae 3a and 4a. Preference is given to first reacting at least a portion of the silane of the general formula 3a with elemental metal.

In the process, preferably at least 2 mol parts, more preferably at least 5 mol parts of silanes of the general formulae 1a and 2a are used per 100 molar parts of silane of the general formula 3a. Preferably, at most 60 mol parts, more preferably at most 30 mol parts of silanes of the general formulae 1a and 2a are used per 100 molar parts of silane of the general formula 3a.

R is preferably a hydrocarbyl radical which is free of ethylenically or acetylenically unsaturated bonds and has from 1 to 18 carbon atoms. Examples of hydrocarbyl radicals R are alkyl radicals such as the methyl, ethyl, n-propyl, isopropyl, n-butyl, isobutyl, tert-butyl, n-pentyl, isopentyl, neopentyl, and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical, octadecyl radicals such as the n-octadecyl radical; cycloalkyl radicals such as cyclopentyl, cyclohexyl, cycloheptyl radicals and methylcyclohexyl radicals; aryl radicals such as the phenyl, naphthyl, anthryl and phenanthryl radicals; alkaryl radicals such as the o-, m-, p-tolyl radicals, xylyl radicals and ethylphenyl radicals; and aralkyl radicals such as the benzyl radical, and the α- and β-phenylethyl radicals.

The R radical is preferably a phenyl radical or linear alkyl radical having from 1 to 10 carbon atoms, more preferably from 1 to 6 carbon atoms. Particularly preferred hydrocarbyl radicals R are the n-propyl, the ethyl, and in particular, the methyl radical.

X is preferably chlorine. In the formulae previously recited, all of the symbols are defined independently of one another, and mixtures of various starting materials can readily be used.

The elemental metals used are preferably Li, Na, K and Mg. When magnesium is used, preference is given to having transition metal halides also present in the reaction mixture, in particular, $ZnCl_2$ and $FeCl_3$. The reaction preferably takes place at at least 20° C. and at most 200° C., in particular at most 160° C. The reaction is preferably carried out under protective gas, preferably Ar or $N_2$. The pressure in the reaction is preferably 1 bar, but may also be considerably higher or lower. The reaction is preferably carried out in an aprotic solvent. Examples of such solvents are ethers such as dioxane, tetrahydrofuran, diethyl ether, diisopropyl ether, diethylene glycol dimethyl ether; hydrocarbons such as pentane, n-hexane, hexane isomer mixtures, heptane, octane, dodecane, wash benzene, petroleum ether, benzene, toluene, xylene, tetrahydronaphthalene; or mixtures of these solvents.

The term solvent does not mean that all reaction components are soluble therein. The reaction may also be carried out in a suspension or emulsion of one or more reaction partners. The reaction may also be carried out in a solvent mixture having a miscibility gap, in each case at least one reaction partner being soluble in each of the mixture phases. The reaction mixture is preferably filtered after it has cooled.

The solution of the product organopolysilanes is preferably precipitated with alcohol. Preferred alcohols are methanol, ethanol, isopropanol, propanol and butanols.

The invention also provides crosslinked and branched organopolysilanes obtainable by the process according to the invention. The organopolysilanes contain preferably at least 10, in particular at least 50 units of the general formula 3. The organopolysilanes contain preferably at least 3, in particular at least 10 units which are selected from units of the general formulae 1 and 2.

In the context of the present invention, unless stated otherwise, all amounts and percentages are based on the weight, all temperatures are 20° C. and all pressures are 1.013 bar (abs.). All viscosities are determined at 25° C.

EXAMPLES

Example 1

Inventive

A five-necked flask which was equipped with a stirrer, dropping funnel, temperature sensor, reflux condenser, and a gas feed, was purged with nitrogen. The flask was initially charged with approx. 470 ml of xylene, and 23 g of sodium cut into small pieces were then introduced. The mixture was heated to 130° C. Subsequently, agitation was begun with gradually increasing stirrer speed. The final stirrer speed was 330 rpm. After approx. 30 minutes, 70 g of phenylmethyldichlorosilane were added dropwise. Five minutes after the addition, 6.4 g of methyltrichlorosilane were subsequently added dropwise. The addition rate was selected such that the xylene was kept boiling. In general, the dropwise addition takes place over 20 to 30 minutes. On completion of the addition, the temperature of the heating was increased to 135° C. and reaction was continued for a further hour. Subsequently, the reaction mixture was allowed to cool slowly. The cooled mixture now at room temperature, was filtered through a pressure filter (2 bar of nitrogen) with a paper filter element (pore size 5 μm). Filtration was complete within 10 minutes. The resulting solution (filtrate) was concentrated and the polysilane was precipitated by pouring the solution into isopropanol. The solid polysilane was separated by filtration and dried.

Example 2

Noninventive

Example 1 was repeated, but the phenylmethyldichlorosilane and methyltrichlorosilane were mixed before addition, the mixture being added dropwise. The filtration required 180 minutes.

Example 3

Inventive

Example 1 was repeated, but a mixture of 70 g of phenylmethyldichlorosilane and 2.8 g of dimethyldichlorosilane was first added dropwise. Subsequently, 6.4 g of methyltrichlorosilane were added dropwise. The filtration required only 15 minutes.

Example 4

Inventive

Example 1 was repeated, but approximately 20 minutes after the methyltrichlorosilane addition, 1 g of trimethylchlorosilane was also added dropwise. The filtration was complete within 5 minutes.

Example 5

Noninventive

Example 4 was repeated, but the phenylmethyldichlorosilane, methyltrichlorosilane, and dimethyldichlorosilane were mixed together and the mixture added dropwise. The filtration requires approximately 100 minutes.

Example 6

Noninventive

Example 4 was repeated, but the phenylmethyldichlorosilane and dimethyldichlorosilane were premixed and divided. One half was metered in immediately, the other half mixed with the methyltrichlorosilane and metered in subsequently. At the end, the trimethylchlorosilane was added. The filtration required 45 minutes.

Example 7

Inventive

Example 6 was repeated with the difference that the methyltrichlorosilane was not added to the second half of the phenylmethyldichlorosilane and dimethyldichlorosilane mixture, but was metered in alone following addition of the first half of the mixture. Subsequently, the second half of the silane mixture and then the trimethylchlorosilane were added. The filtration lasted only 5 minutes.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A process for preparing crosslinked or branched organopolysilanes which comprise at least one unit of formulae 1 and 2

$$RSi\equiv \tag{1},$$

$$=Si= \tag{2};$$

at least one unit of the formula 3

$$R_2Si= \tag{3};$$

and optionally units of the formula 4

$$R_3Si- \tag{4}$$

wherein at least one silane of the formulae 1a and/or 2a $$RSiX_3 \tag{1a},$$

$$SiX_4 \tag{2a},$$

at least one silane of the formula 3a $$R_2SiX_2 \tag{3a},$$

and optionally one or more silanes of the general formula 4a $$R_3SiX \tag{4a}$$

where

R is hydrogen or a hydrocarbyl radical having from 1 to 18 carbon atoms and

X is fluorine, chlorine or bromine, are reacted in a plurality of steps with an elemental alkali metal, the addition of the reactants 1(a) through 4(a) being such that the silane of the general formula 3a during its reaction with elemental metal in any given step contains at most 1 mol % of silane of the formulae 1a and 2a, and wherein at least two molar parts of total silanes of the formulas 1a and 2a are reacted per 100 parts of the silane of formula 3a.

2. The process of claim 1, in which from up to 60 mol parts of silane(s) of the formulae 1a and 2a are reacted per 100 mol parts of silane(s) of the formula 3a.

3. The process of claim 1, wherein R is a phenyl radical or a linear alkyl radical having from 1 to 10 carbon atoms.

4. The process of claim 2, wherein R is a phenyl radical or a linear alkyl radical having from 1 to 10 carbon atoms.

5. The process of claim 1, wherein the elemental metal is selected from the group consisting of Li, Na, K, and mixtures thereof.

6. The process of claim 2, wherein the elemental metal is selected from the group consisting of Li, Na, K, and mixtures thereof.

7. The process of claim 3, wherein the elemental metal is selected from the group consisting of Li, Na, K, and mixtures thereof.

8. The process of claim 4, wherein the elemental metal is selected from the group consisting of Li, Na, K, and mixtures thereof.

9. The process of claim 1, wherein the reaction is carried out in an aprotic solvent.

10. The process of claim 1, wherein R is phenyl, methyl, or a mixture thereof.

11. A branched or crosslinked organopolysilane obtained by the process of claim 1.

12. A process for preparing crosslinked or branched organopolysilanes which comprise at least one unit of formulae 1 and 2

$$RSi\equiv \tag{1},$$

$$=Si= \tag{2};$$

at least one unit of the formula 3

$$R_2Si= \tag{3};$$

and optionally units of the formula 4

$$R_3Si- \tag{4}$$

wherein at least one silane of the formulae 1a and/or 2a $$RSiX_3 \tag{1a},$$

$$SiX_4 \tag{2a},$$

at least one silane of the formula 3a $$R_2SiX_2 \tag{3a},$$

and optionally one or more silanes of the general formula 4a $$R_3SiX \tag{4a}$$

where

R is hydrogen or a hydrocarbyl radical having from 1 to 18 carbon atoms and

X is fluorine, chlorine or bromine, are reacted in a plurality of steps with an elemental alkali metal, or a mixture thereof, the addition of the reactants 1(a) through 4(a) being such that the silane of the formula 3a during its reaction with elemental metal in any given step contains at most 2 mol % of silane of the formulae 1a and 2a.

13. The process of claim 12, wherein during the reaction of the silane of formula 3a, not more than 1 mol percent of total silanes of the formulae 1a and 2a are present during reaction of the silane of formula 3a with elemental metal.

14. The process of claim 12, wherein during the reaction of the silane of formula 3a, not more than 0.1 mol percent of total silanes of the formulae 1a and 2a are present during reaction of the silane of formula 3a with elemental metal.

15. The process of claim 12, wherein during the reaction of the silane of formula 3a, not more than 0.01 mol percent of total silanes of the formulae 1a and 2a are present during reaction of the silane of formula 3a with elemental metal.

16. The process of claim 12, wherein all of the silane of formula 3a is reacted in a first step, and remaining silanes are subsequently reacted.

17. The process of claim 12, wherein a portion of the silane of formula 3a is reacted in a first step, silanes of the formulae 1a, 2a, and 4a or mixtures thereof are reacted in a second step, and a further portion of silane of the formula 3a is reacted in a subsequent step.

18. The process of claim 12, wherein silanes of the formulae 1a and 2a total at least 5 mol parts per 100 mol parts of silanes of the formula 3a.

* * * * *